United States Patent [19]

White et al.

[11] 3,929,938

[45] Dec. 30, 1975

[54] LIMONENE/PHENOL CONDENSATION PRODUCTS AND HOT-MELT ADHESIVES CONTAINING THE SAME ALONG WITH ETHYLENE/UNSATURATED ESTER COPOLYMERS

[75] Inventors: Raymond Hadley White; Fredric Martin Hill, both of Pensacola, Fla.

[73] Assignee: Reichhold Chemicals, Inc., White Plains, N.Y.

[22] Filed: Apr. 25, 1973

[21] Appl. No.: 354,454

Related U.S. Application Data

[60] Continuation-in-part of Ser. No. 174,190, Aug. 23, 1971, abandoned.

[52] U.S. Cl. ...... 260/897 B; 260/62; 260/28.5 AV; 260/33.6 PQ; 156/327; 156/332; 156/334
[51] Int. Cl.² .......................................... C08L 23/08
[58] Field of Search .............................. 260/897, 62

[56] References Cited

UNITED STATES PATENTS

| | | | |
|---|---|---|---|
| 2,471,453 | 5/1949 | Rummelsburg | 260/62 |
| 2,471,455 | 5/1949 | Rummelsburg | 260/62 |
| 2,596,235 | 5/1952 | Geiger | 260/619 |
| 3,275,494 | 9/1966 | Brunson et al. | 161/33 |
| 3,448,178 | 6/1969 | Flanagan | 260/897 |
| 3,626,026 | 12/1971 | Fukumura et al. | 260/857 |

*Primary Examiner*—Carman J. Seccuro

[57] ABSTRACT

Condensation products are prepared by the acid catalyzed condensation of from 1.4 to 2.0 moles of limonene and one mole of phenol. These condensation products can be admixed with an ethylene/vinyl ester copolymer, an ethylene/acrylate ester copolymer, an ethylene/methacrylate ester copolymer or with a mixture of such ester copolymers to form hot-melt adhesive compositions.

5 Claims, No Drawings

LIMONENE/PHENOL CONDENSATION PRODUCTS AND HOT-MELT ADHESIVES CONTAINING THE SAME ALONG WITH ETHYLENE/UNSATURATED ESTER COPOLYMERS

RELATED APPLICATIONS

The present application is a continuation-in-part of our prior application Ser. No. 174,190, filed Aug. 23, 1971, now abandoned.

A division of Ser. No. 354,454 was filed Apr. 3, 1974, bearing Ser. No. 457,407, and contains claims covering the method of Ser. No. 354,454.

DETAILED DESCRIPTION

Hot-melt adhesives are generally themoplastic materials useful as bonding agents. At room temperature, the adhesives are non-tacky solids but upon being heated they soften and/or melt into a liquid or semi-liquid tacky condition. The melted or softened adhesive can then be applied to a substrate and permitted to cool; the adhesive adheres to the substrate. Such a material can thus be used as a bonding agent to join two substrates, with the adhesive forming an intermediate layer bound to both.

At room temperature the hot-melt adhesives are generally hard, and a thin film of these adhesives has sufficient tensile strength and elongation so that in many cases it is stronger than the substrates being bonded. The adhesives are generally insensitive to pressure once permitted to cool to their solid non-tacky condition, e.g. cold flow is limited.

Commercially, hot-melt adhesive compositions have been prepared using copolymers of ethylene and vinyl acetate, as the major film forming ingredient, combined with a tackifying agent. One useful tackifying agent has been a phenol-bicyclic terpene condensation product, specifically formed by the reaction of an equimolar amount of alphapinene and phenol. Such a material is disclosed by Flanagan in U.S. Pat. No. 3,448,178. An even earlier disclosure of this type of material was made by Schroeder in U.S. Pat. No. 2,772,247 where the basic film-forming resin was a mixture of polyethylene and polyvinyl acetate and the tackifying agent was the phenol condensation product of alpha- or beta-pinene.

Butler, in U.S. Pat. No. 3,025,167, discloses generically the use of "terpene resins" as optional additives to a composition comprising a wax and an ethylene/vinyl acetate copolymer for use in the sealing of food packages.

In accordance with one aspect of this invention, there are provided condensation products prepared by the acid catalyzed condensation of from 1.4 to 2.0 moles of limonene (d- or l- or a mixture thereof such as dipentene or a mixture of d-limonene and dipentene) and one mole of phenol. These condensation products are characterized by a high melting point of at least 140°C. (Ball and Ring). These condensation products are non-thermosetting, have a high degree of thermal stability, and impart improved tack, elongation and tensile strength to hot-melt adhesives in blends with ethylene/unsaturated ester copolymers. The condensation products are prepared by reacting the limonene and the phenol in the presence of an acidic catalyst, such as boron trifluoride, hydrogen fluoride and substituted sulphonic acids. Reaction temperatures within the range from 10°C. to 45°C. are preferred.

Also, in accordance with the present invention, mixtures comprising: (1) a copolymer of ethylene and a 1,2-monoethylenically unsaturated ester, selected from the group consisting of a vinyl ester, wherein the acid group of the vinyl ester is derived from a saturated fatty acid having from one to about five carbon atoms, and acrylate and methacrylate esters wherein the alcohol group is derived from a saturated aliphatic alcohol having one to about five carbon atoms, and (2) the condensation product previously described can be prepared as hot-melt adhesives.

Generally the hot-melt adhesive compositons will contain from at least about 25% up to about 400% by weight of the condensation product based upon the weight of the copolymer. The ethylene/unsaturated ester copolymers are well known to the art and have been prepared by many commercial methods. The most commonly used vinyl ester is vinyl acetate.

Ethylene/vinyl acetate copolymers have been prepared by copolymerizing a mixture of ethylene and vinyl acetate in the presence of a catalyst, such as oxygen or an organic peroxide, such as dibutylhydroperoxide, in a tubular reactor under gauge pressures ranging from 15,000 lbs. per square inch to about 30,000 lbs. per square inch and at temperatures ranging from about 300° to about 480°F. The copolymer is then separated from the residual monomer and other by-products. By varying the conditions of pressure, temperature, catalyst concentration and proportion of vinyl acetate and ethylene, one can obtain copolymers of varying molar proportions of ethylene to vinyl acetate, having different inherent viscosities and thus different molecular weights.

For further information regarding the preparation of such copolymers, see British Pat. No. 835,466 published May 18, 1960 and Belgium Pat. No. 586,895. In addition see U.S. Pat. No. 3,448,178.

The ethylene/vinyl ester copolymers (e.g., ethylene/vinyl acetate) are tough, rubbery, generally non-crystalline materials having a molecular weight of the order of from about 200,000 to about 500,000 and an inherent viscosity, measured at 86°F., in a 0.25% solution of the copolymer in toluene of 0.45 to 1.5. The copolymers of ethylene and vinyl ester, e.g. vinyl acetate, can contain from about 4 to about 16 mols ethylene per mol of vinyl acetate, or other vinyl ester. These copolymers preferably contain from about 4 to about 6 mols ethylene per mol vinyl acetate and have inherent viscosity of from about 0.6 to about 1.2.

Ethylene/acrylate and ethylene/methacrylate copolymers are also commercially available materials, often with properties similar to the corresponding vinyl ester. For example, ethylene/vinyl acetate copolymers behave in adhesives in a manner similar to that of the ethylene vinyl acrylate copolymer. The acrylate and methacrylate esters commerically available include methyl acrylate, ethyl acrylate, butyl acrylate, methyl methacrylate and ethylmethacrylate. Methacrylate and acrylate copolymers with ethylene are well known and can be formed by the same procedures as the vinyl ester set forth above and in the same proportion of acrylate, or methacrylate, and ethylene.

Although the ethylene/monounsaturated ester copolymers per se are generally not suitable for use as hot-melt adhesives, either alone or in admixture with the more common waxy materials used for such purposes, the addition of the condensation products of the present invention renders the ethylene/vinyl ester copolymers useful in such compositions. Indeed, the high strength properties of the copolymers in combination with the condensation products of this invention result in a superior hot-melt adhesive having an unusual combination of great adhesiveness and relatively great strength.

In accordance with the present invention a hot-melt adhesive composition can be prepared as follows:
1. The limonene/phenol condensation product is placed in a jacketed mixing pot equipped with a stirring means. The temperature is raised to about 300°F.
2. The ethylene/mono-unsaturated ester copolymer is slowly added after the condensation product has melted.
3. Stirring and heating are continued until a clear, homogenous mass is obtained. The thus prepared hot-melt adhesive composition can be maintained in this molten state and used immediately or may be extruded or molded into any desired form, including the "rope form," pellets or slabs.

The temperature of the mixing vessel can be maintained at from about 250°F. to about 350°F. with from about 300° to about 350°F. as being preferred.

The hot-melt adhesive composition according to the present invention can also include a proportion of a waxy material substituted for a portion of the ethylene/mono-unsaturated ester copolymer. The wax material reduces the melt viscosity, or cohesiveness, of the composition without appreciably affecting the adhesive qualities of the material. Useful wax materials which may be employed in the composition according to the present invention include low-molecular weight ethylene polymers, i.e., from 1500 to about 2500 molecular weight; oxidized such polymers; hydrogenated animal oils, such as hydrogenated tallow or lard; hydrogenated vegetable oils, such as hydrogenated soya oil, cottonseed oil or castor oil and the like; hydrogenated fish oils, such as menhaden oil or cod liver oil; paraffin wax, microcrystalline wax and the Fischer-Tropsch waxes prepared, for example, by polymerizing carbon monoxide and hydrogen.

The hot-melt adhesive compositions according to the present invention vary in their properties depending upon the proportions of the copolymer and limonene-phenol condensation product utilized. For example, compositions containing from about 22 to about 30% by weight copolymers of ethylene and vinyl acetate and 78 to 70% of the condensation product will have a relatively low viscosity at temperatures of 250° to 350°F., and can be used, for example, in roller applicator equipment of conventional type and will adhere to a wide variety of solid substrates. These materials are completely solid at room temperatures and require no volatile vehicles.

Compositions comprising about 45 percent by weight ethylene/vinyl acetate copolymer and 55 percent limonene/phenol condensation product have a fast bonding time, i.e. time in which the adhesive sets and becomes solid, adhere to a wide variety of surfaces and form extremely high bond strengths. They also have good resistance to deformation at relatively elevated temperatures, i.e., up to about 130°F., and also have good flexibility at low temperatures, i.e., down to about 20°F. These products are especially easily handled in a wide variety of forms and are used, for example, in bookbinding and in making wax-glassine bags, i.e., "wax-paper" bags, where the bond strength is greater than the paper strength.

Compositions containing about 80% ethylene/vinyl acetate copolymer and about 20% limonene/phenol condensation products are extremely tough, have extremely fast bond times and even superior high-temperature resistance, while at the same time maintaining low-temperature flexibility. These materials are extremely useful in sealing packages such as those containing hot foods; because of their lack of volatile vehicles, these adhesives are safe for packaging use without fear of migration of harmful compounds into the food products.

The following examples illustrate preferred embodiments of the present invention but are not intended to be exhaustive thereof:

EXAMPLE 1

A solution of 37.6 grams of phenol (contaminated with a very small amount of water) in 80.0 grams of a mixture of naphtha and toluene was dehydrated for 1.5 hours at 109°C. Dehydration was achieved by azeotropic distillation and removal of the water. After removal of the water, the solution was cooled to 15°C. and 5.5 grams of $BF_3$ etherate was added. To the stirred and cooled reaction was added 81.7 grams of d-limonene over 1.25 hours while maintaining the temperature at 10°–15°C. The temperature was maintained at 15°–25°C. for 17 hours after the complete addition of the limonene. The reaction mixture was then washed three times with water, each time using 150 ml. of water heated to 70°C. The non-aqueous phase was then heated to 220°C. with a nitrogen sparge to remove solvent. After most of the solvent had been removed, a steam sparge was introduced and the nitrogen sparge discontinued. The resinous mass was steamed at 270°–275°C. for 10 minutes. The steam sparge was discontinued and a nitrogen sparge initiated to dry and cool the resin to 250°C. The resin was poured out to cool, and had the following properties:

| | |
|---|---|
| Color | N-WG(rosin color grade) |
| Ball and Ring Melting Point | 140°C. |
| Yield | 94.0% |

EXAMPLE 2

A solution of 37.6 grams pf phenol (contaminated with a very small amount of water) in 80.0 grams of a mixture of naphtha and toluene was dehydrated for 1.5 hours at 109°C. Dehydration was achieved by azeotropic distillation and removal of the water. After removal of the water, the solution was cooled to 25°C. and 5.5 grams of $BF_3$ etherate was added. To the stirred and cooleld reaction vessel was added 81.7 grams of d-limonene over 0.25 hours while maintaining the temperature at 20°–25°C. The temperature was maintained at 20°–25°C. for 17 hours after the complete addition of the d-limonene. The reaction mixture was then washed three times with water, each time using 150 ml of water heated to 70°C. The non-aqueous phase was then heated to 220°C. with a nitrogen sparge to remove solvent. After most of the solvent has been removed, a steam sparge was introduced and the nitrogen sparge discontinued. The resinous mass was steamed at 270°–275°C. for 10 minutes. The steam sparge was discontinued and a nitrogen sparge initiated to dry and cool the resin to 250°C. The resin was pured out to cool, and had the following properties:

| | |
|---|---|
| Color | N-WG(rosin color grade) |
| Ball and Ring Melting Point | 141°C. |
| Yield | 93.9% |

EXAMPLE 3

87.0 Grams of the resin in Example 1 and 87.0 grams of the resin in Example 2 were remelted in admixture under a nitrogen blanket to 250°C. The nitrogen was discontinued and a steam sparge introduced. The resin mixture was steamed at 270°–275°C. for 30 minutes. The steam sparge was discontinued and a nitrogen sparge initiated to dry and cool the resin to 250°C. The resin was poured out to cool and had the following properties:

| | |
|---|---|
| Color | N (rosin color grade) |
| Ball and Ring Melting Point | 155°C. |
| Naphtha Insolubles | 29% |
| Yield | 85.6% (based on original limonene phenol added) |

The resin was formulated as follows for hot melt evaluation:

| | |
|---|---|
| Ethylene Vinyl Acetate Copolymer | 75.0 grams |
| Petroleum Wax | 75.0 grams |
| Aromatic hydrocarbon oil processing aid | 50.0 grams |
| Limonene-Phenol Resin | 50.0 grams |

Films were drawn of this composition and gave the following results:

| | |
|---|---|
| Tensile, psi | 264 |
| Elongation, % | 125 |

EXAMPLE 4

A solution of 16 grams of toluene and 37.6 grams of phenol (contaminated with a very small amount of water) was dehydrated for 20 hours at 132°C. Dehydration was achieved by azeotropic distillation and removal of the water. After removal of the water, the solution was cooled to 30°C. and 5.5 grams of BF$_3$ etherate was added. 56.0 Grams of isoparaffinic naphtha solvent and 8.0 grams of toluene were adddded to a reaction vessel and cooled to 20°C. The toluene/phenol/BF$_3$ etherate solution and 81.7 grams of limonene were added to the stirred and cooled reaction vessel over 0.30 hours while maintaining the temperature at 20°–25°C. The temperature was maintained at 20°–25°C. for 18 hours after the complete addition of the toluene/phenol/BF$_3$ etherate solution and d-limonene. The reaction mixture was then washed three times with water, each time using 150 ml. of water heated to 70°C. The non-aqueous phase was then heated to 220°C. with a nitrogen sparge to remove solvent. After most of the solvent had been removed, a steam sparge was introduced and the nitrogen sparge discontinued. The resinous mass was steamed at 270°–275°C. for 30 minutes. The steam sparge was discontinued and a nitrogen sparge initiated to dry and cool the resin to 250°C. The resin was poured out to cool, and had the following properties:

| | |
|---|---|
| Color | WG (rosin color grade) |
| Ball & Ring Melting Point | 147°C. |
| Naphtha Insolubles | 26% |
| Yield | 83.0% |

The resin was formulated as follows for hot melt evaluation:

| | |
|---|---|
| Ethylene Vinyl Acetate Copolymer | 45.0 grams |
| Petroleum Wax | 45.0 grams |
| Aromatic hydrocarbon oil processing aid | 30.0 grams |
| Limonene-Phenol Resin | 30.0 grams |

Films were drawn of this composition and gave the following results:

| | |
|---|---|
| Tensile, psi. | 262 |
| Elongation, % | 113 |

EXAMPLE 5

A solution of 223 grams of phenol (contaminated with a very small amount of water) in 504 grams of a mixture of naphtha and toluene solvent was dehydrated for 1.5 hours at 112°C. Dehydration was achieved by azeotropic distillation and removal of the water. After removal of the water, the solution was cooled to 30°C. and 35 grams of BF$_3$ etherate was added. To the stirred and cooled reaction vessel was added 484 grams of d-limonene over 1.25 hours while maintaining the temperature at 20°–25°C. The temperature was maintained at 20°–25°C. for 17.75 hours after the complete addition of the d-limonene. The reaction mixture was then washed 6 times with water, each time using 350 ml. of water heated to 70°C. The non-aqueous phase was then heated to 220°C. with a nitrogen sparge to remove solvent. After most of the solvent had been removed, a steam sparge was introduced and the nitrogen sparge discontinued. The resinous mass was steamed at 270°–275°C. for 70 minutes. The sterem sparge was discontinued and a nitrogen sparge initiated to dry and cool the resin to 250°C. The resin was poured out to cool, and had the following properties:

| | |
|---|---|
| Color | WW (rosin color grade) |
| Ball & Ring melting point | 150°C. |
| Naphtha Insolubles | 20.3% |
| Yield | 90.3% |

The rosin was formulated as follows for hot melt evaluation:

| | |
|---|---|
| Ethylene vinyl acetate copolymer | 75.0 grams |
| Petroleum wax | 75.0 grams |
| Aromatic hydrocarbon oil processing aid | 50.0 grams |
| Limonene-Phenol Resin | 50.0 grams |

Films were drawn of this composition and gave the following results:

| | |
|---|---|
| Tensile, psi. | 257 |
| Elongation, % | 100 |

A commercial resin was tested in the same formulation to give the following tensile and elongation for comparison. All tensile tests were performed at 75°C. Commercial Resin Formulation:

| | |
|---|---|
| Ethylene vinyl acetate copolymer | 75.0 grams |
| Petroleum wax | 75.0 grams |
| Aromatic hydrocarbon oil processing aid | 50.0 grams |
| Commercial Terpene-Phenol | 50.0 grams |

Films were drawn of this composition and gave the following results:

| | |
|---|---|
| Tensile, psi | 221 |
| Elongation, % | 103 |

It can be seen that the high melting resin described here exhibits higher tensile strength and generally somewhat better elongation over the commercial resin.

EXAMPLE 6

A solution of 94 grams of phenol (contaminated with a very small smount of water) and 255 grams of a mixture of naphtha and toluene was dehydrated at reflux for 2.0 hours. Dehydration was achieved by azeotropic distillation and removal of the water. After removal of the water, the solution was cooled and 12.5 grams of $BF_3$ etherate was added. To the stirred and cooled reaction vessel was added 109 grams of d-limonene while maintaining the temperature at 20°–25°C. The temperature of the reaction mass was raised to 40°C. and 109 grams of d-limonene was added while maintaining the temperature at 40°–45°C. After the addition of the limonene, the polymerization solution was stirred and was allowed to set overnight. The reaction mixture was then washed three times with water, each time using 500 ml. of hot water. The non-aqueous phase was then heated to 215°C. with a nitrogen sparge to remove solvent. After most of the solvent had been removed, a steam sparge was introduced and the nitrogen sparge discontinued. The resinous mass was steamed at 275°–280°C. for 25 minutes. The steam sparge was discontinued, the resin was poured out to cool, and had the following properties:

| | |
|---|---|
| Color | XA (USDA rosin color) |
| Ball & Ring Melting Point | 158°C. |
| Yield | 86.5% |
| Naphtha Insolubles | 0% |

EXAMPLE 7

A solution of 94 grams of phenol (contaminated with a very small amount of water) and 245 grams of a mixture of naphtha and toluene was dehydrated at reflux for 2.0 hours. Dehydration was achieved by azeotropic distillation and removal of the water. After removal of the water, the solution was cooled to 25°C. and 13.6 grams of $BF_3$ etherate was added. To the stirred and cooled reaction vessel was added 122.5 grams of d-limonene while maintaining the temperature at 20°–25°C. and 13.6 grams of $BF_3$ etherate was added. The temperature of the reaction mass was raised to 40°C. and 122.5 grams of d-limonene was added while maintaining the temperature at 40°–45°C. After the addition of the limonene, the polymerization solution was allowed to set overnight. The reaction mixture was then washed three times with water, each time using 500 ml. of hot water. The non-aqueous phase was then heated to 215°C. with a nitrogen sparge to remove solvent. After most of the solvent had been removed, a steam sparge was introduced and the nitrogen sparge discontinued. The resinous mass was steamed at 275°–280°C. for 25 minutes. The steam sparge was discontinued. The resin was poured out to cool, and had the following properties:

| | |
|---|---|
| Color | XA (USDA rosin color) |
| Ball & Ring Melting Point | 159.5°C. |
| Yield | 87.0% |
| Naphtha Insolubles | 0% |

EXAMPLE 8

A solution of dehydrated phenol and solvent (naphtha-toluene) containing 94 grams of phenol and 188 grams of solvent (naphtha-toluene) was charged to a reaction vessel. To this same vessel 15.0 grams of $BF_3$ etherate and 56 grams of dehydrated solvent (naphtha-toluene) was added. To the stirred reaction was added 272 grams of d-limonene over a 0.5-hour period while maintaining the temperature at 40°–45°C. After the addition of the limonene was complete, the reaction mass was stirred for 2.0 hours and then allowed to set for 16.0 hours without stirring. The reaction mixture was then washed three times with water, each time using 350 ml. of water that had been heated to 70°C. The non-aqueous phase was then heated to 200°C. with a nitrogen sparge to remove solvent. After most of the solvent had been removed, a steam sparge was introduced and the nitrogen sparge discontinued. The resinous mass was steamed at 275°–280°C. for 15 minutes. The steam sparge was discontinued and the nitrogen sparge reintroduced to dry and cool the resin to 250°C. The resin was poured out to cool, and had the following properties:

| | |
|---|---|
| Color | WW (USDA rosin color) |
| Ball & Ring Melting Point | 148°C. |
| Yield | 87.2% |
| Naphtha Insolubles | 0% |

EXAMPLE 9

A solution of 94 grams of phenol (contaminated with a very small amount of water) and 228 grams of naphtha toluene solvent was dehydrated at reflux for 3.0 hours. Dehydration was achieved by azeotropic distillation and removal of the water. After removal of the water, the solution was cooled to room temperature and 11.4 grams of $BF_3$ etherate was added. To the stirred and cooled reaction vessel was added 95 grams of d-limonene while maintaining the temperature at 25°–30°C. The temperature of the reaction mass was raised to 35°C. and 95 grams of d-limonene was added while maintaining the temperature at 35°–40°C. After the addition of the limonene, the polymerization solution was stirred and was allowed to set overnight. The reaction mixture was then washed three times with water, each time using 500 ml. of hot water. The non-aqueous phase was then heated to 230°C. with a nitrogen sparge to remove solvent. After most of the solvent had been removed, a steam sparge was introduced and the nitrogen sparge discontinued. The resinous mass was steamed to 280°C. for 25 minutes. The steam sparge was discontinued. The resin was poured out to cool, and had the following properties:

| | |
|---|---|
| Color | XA (USDA rosin color) |
| Ball & Ring Melting Point | 143°C. |
| Yield | 88.7% |
| Naphtha Insolubles | 21.8% |

EXAMPLE 10

A solution of 94 grams of phenol (contaminated with a very small amount of water) and 244 grams of naphtha-toluene solvent was dehydrated at reflux for 2.0 hours. Dehydration was achieved by azeotropic distillation and removal of the water. After removal of the water, the solution was cooled to 25°C. and 12 grams of $BF_3$ etherate was added. To the stirred and cooled reaction vessel was added 204 grams of d-limonene over a 1.0 hour period while maintaining the temperature at 20°–25°C. The solution was heated to 45°C. and held for 1.0 hour. The solution was allowed to set at room temperature for 18 hours. The reaction mixture was washed three times with water, each time using 500 ml. of hot water. The non-aqueous phase was heated to 220°C. with a nitrogen sparge to remove solvent. After most of the solvent had been removed, a steam sparge was introduced and the nitrogen sparge discontinued. The resinous mass was steamed at 275°C. for 25 minutes. The steam sparge was then discontinued. The resin was poured out to cool and had the following properties:

| | |
|---|---|
| Color | X (USDA rosin color) |
| Ball & Ring Melting Point | 159°C. |
| Yield | 88.9% |
| Naphtha Insolubles | 0% |

EXAMPLE 11

A solution of 94 grams pf phenol (contaminated with aa very small amount of water) and 245 grams of naphtha toluene solvent was dehydrated at 124°C. for 1.5 hours. Dehydration was achieved by azeotropic distillation and removal of the water. After removal of the water, the solution was cooled to 40°C. and 15 grams of $BF_3$ etherate was added. To the stirred and cooled reaction vessel was added 102 grams of d-limonene over a 0.45 hour period while maintaining the temperature at 20°–25°C. Then, 102 grams of d-limonene were added over 0.25 hours while allowing the temperature of the reaction mass to rise to 40°C. and then maintaining the temperature at 40°–45°C. After the addition of the limonene was complete, the reaction mixutre was stirred for 2 hours and then allowed to set for 19 hours without stirring. The reaction mixture was washed three times with water, each time using 500 ml. of water that had been heated to 70°C. The non-aqueous phase was heated to 220°C. with a nitrogen sparge to remove solvent. After most of the solvent had been removed, a steam sparge was introduced and the nitrogen sparge discontinued. The resinous mass was steamed at 275°–280°C. for 15 minutes. The steam sparge was discontinued and the nitrogen sparge reintroduced to dry and cool the resin to 250°C. The resin was poured out to cool, and had the following properties:

| | |
|---|---|
| Color | WW (USDA rosin color) |
| Ball & Ring Melting Point | 154°C. |
| Yield | 92.3% |
| Naphtha Insolubles | 0% |

EXAMPLE 12

A solution of dehydrated phenol and naphtha-toluene solvent containing 94 grams of phenol and 188 grams of naphtha-toluene solvent was charged to a reaction vessel. To this same vessel was added 15 grams of $BF_3$ etherate and 56 grams of dehydrated naphtha-toluene solvent and the solution was cooled to 20°C. To the stirred and cooled reaction vessel was added 272 grams of d-limonene over a 1.25 hour period while maintaining the temperature at 20°–25°C. After the addition of limonene was complete the reaction mixture was stirred for 1.5 hours and then allowed to set for 16 hours without stirring. The reaction mixture was washed three times with water, each time using 350 ml. of water that had been heated to 70°C. The non-aqueous phase was heated to 220°C. with a nitrogen sparge to remove solvent. After most of the solvent had been removed, a steam sparge was introduced and the nitrogen sparge discontinued. The resinous mass was steamed at 275°–280°C. for 15 minutes. The steam sparge was discontinued and the nitrogen sparge reintroduced to dry and cool the resin to 250°C. The resin was poured out to cool, and had the following properties:

| | |
|---|---|
| Color | X (USDA rosin color) |
| Ball & Ring Softening Point | 147°C. |
| Yield | 87.6% |
| Naphtha Insolubles | 0% |

EXAMPLE 13

A sample of the Heads cut from a citrus limonene fractionation was examined by gas chromatography and found to have the following composition: 5.4% α-pinene, 2.4% β-pinene, 5.9% α-phellandrene or α-terpinene and 86.3% d-limonene. A solution of 94 grams of phenol (contaminated with a very small amount of water) and 312 grams of naphtha-toluene solvent was dehydrated at 120°C. for 2.5 hours. Dehydration was achieved by azeotropic distillation and removal of water. After the removal of the water, the solution was cooled to 35°C. and 9.4 grams of $BF_3$ etherate was added. The solution was then cooled to 20°C. To the stirred and cooled reaction vessel was added 109 grams of the above Heads cut over a 0.42 hour period while maintaining the temperature at 20°–25°C. After waiting for 5 minutes and seeing no exotherm in the reaction mixture, 109 grams more of Heads was added over a 10 minute period while allowing the temperature to rise to 40°C., then maintaining at 40°–45°C. After the addition of the Heads cut was complete, the reaction mixture was stirred for 2.0 hours and then allowed to set for 16 hours without stirring. The reaction mixture was washed four times with water, each time using 500 ml. of water that had been heated to 70°C. The non-aqueous phase was heated to 220°C. with a nitrogen sparge to remove solvent. After most of the solvent had been removed, a steam sparge was introduced and the nitrogen sparge discontinued. The resinous mass was steamed at 275°–280°C. for 30 minutes. The steam sparge was discontinued and the nitrogen sparge reintroduced to dry and cool the resin to 250°C. The resin was poured out to cool, and had the following properties:

| | |
|---|---|
| Color | X(USDA rosin color) |
| Ball & Ring Melting Point | 148°C. |
| Yield | 89.9% |
| Naphtha Insolubles | 0 |

In the above examples, the films are prepared by means of a heated Bird applicator, the hot-melt adhesive composition being cast on a Teflon coated sheet to give a film thickness of about 20 mils. After cooling, the films are tested as follows:

a. The test carried out for tensile strengh is method A of ASTM D 882-56T, using an Instron Tensile tester.
b. Elongation before breaking was determined using a strip of film approximately one inch wide, in accordance with the test method set forth in ASTM D 882-56T.

Both the above tests are carried out at room temperature, i.e., at about 20°C.

The patentable embodiments of the above-identified invention are set forth hereunder:

1. A hot-melt adhesive composition comprising:
    a. a copolymer of ethylene and a 1,2-monoethylenically unsaturated ester selected from the group consisting of vinyl esters wherein the acid group contains from one to five carbon atoms and acrylic and methacrylic esters of saturated alcohols having from one to five carbon atoms, and mixtures of such copolymers, and
    b. a limonene/phenol condensation product resulting from the acid catalyzed condensation between from 1.4 to 2.0 moles of limonene and 1 mole of phenol.

2. The composition of claim 1 wherein the vinyl ester is vinyl acetate.

3. The composition of claim 1 wherein the limonene is d-limonene.

4. The composition of claim 1 wherein the ester is an acrylic ester.

5. The composition of claim 1 wherein the ester is a methacrylic ester.

\* \* \* \* \*